United States Patent [19]

Bachelder

[11] 4,252,598
[45] Feb. 24, 1981

[54] APPARATUS FOR BONDING A TRANSPARENT COVER SHEET TO A PHOTOGRAPH

[75] Inventor: Albert J. Bachelder, Lexington, Mass.

[73] Assignee: Polaroid Corporation, Cambridge, Mass.

[21] Appl. No.: 910,448

[22] Filed: May 30, 1978

[51] Int. Cl.³ ........................ B32B 31/12; B65H 3/06
[52] U.S. Cl. ........................ 156/556; 156/364; 156/571; 156/578; 271/119; 271/121; 271/127; 354/317
[58] Field of Search ............ 156/381, 555, 556, 571, 156/578, 352, 360, 364, 368; 271/113, 119, 121, 126, 127; 354/84, 86, 88, 317, 319

[56] References Cited

U.S. PATENT DOCUMENTS

| | | | |
|---|---|---|---|
| 1,108,188 | 8/1914 | Knapp | 156/453 |
| 1,809,262 | 6/1931 | Aicher | 156/364 |
| 2,798,021 | 7/1957 | Land | 156/295 |
| 3,405,617 | 10/1968 | Land et al. | 430/404 |
| 3,405,618 | 10/1968 | Land et al. | 354/84 |
| 3,438,835 | 4/1969 | Chen et al. | 156/522 |
| 3,540,970 | 11/1970 | Huntwork | 156/364 |
| 3,543,622 | 12/1970 | Rice | 83/117 |
| 3,547,013 | 12/1970 | Gentry et al. | 93/36.6 |
| 3,593,988 | 7/1971 | Collins | 271/127 X |
| 3,659,512 | 5/1972 | Dietz et al. | 354/88 |
| 3,751,324 | 8/1973 | Enskat | 156/521 |
| 3,770,550 | 11/1973 | Levitan | 156/498 |
| 3,786,736 | 1/1974 | Neeb et al. | 354/317 |
| 3,827,687 | 8/1974 | Kono | 271/127 X |
| 3,952,183 | 4/1976 | Abe | 271/119 X |
| 3,956,764 | 5/1976 | Schausberger | 354/319 X |

*Primary Examiner*—Michael G. Wityshyn
*Attorney, Agent, or Firm*—John S. Vale

[57] ABSTRACT

An apparatus for automatically bonding or laminating a transparent protective cover sheet to the image-bearing surface of a photograph, preferably of the type prepared by a diffusion transfer process. The cover sheet includes a layer of fluid activatable bonding agent on one side thereof. The apparatus is configured to advance a photograph past a fluid treating station where its image-bearing surface is washed and wetted with activating fluid and simultaneously advance a cover sheet from one end of a stack to feed the photograph and cover sheet between a pair of pressure rollers which bring the photograph and cover sheet into superposition to effect the bond therebetween.

2 Claims, 9 Drawing Figures

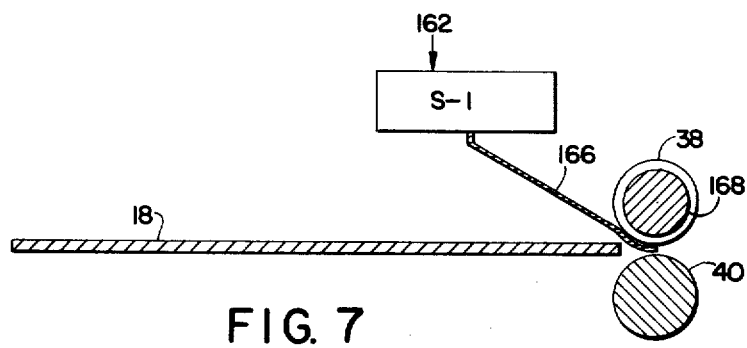
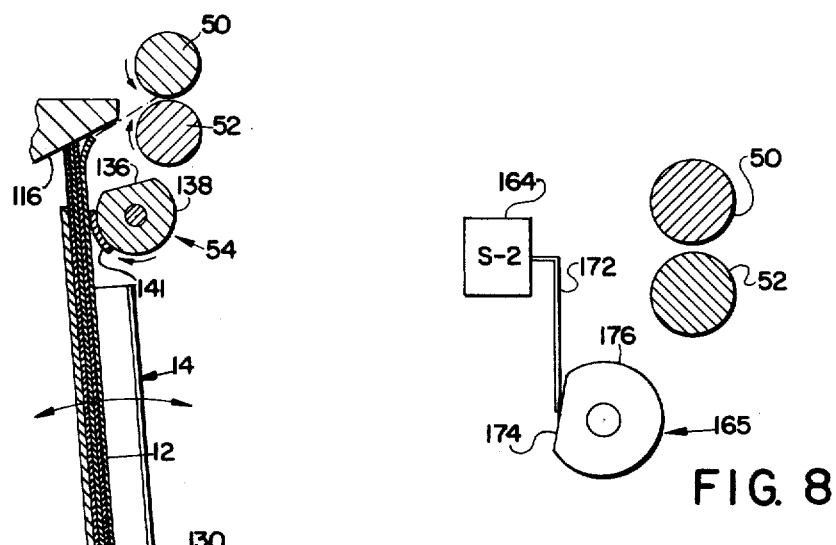
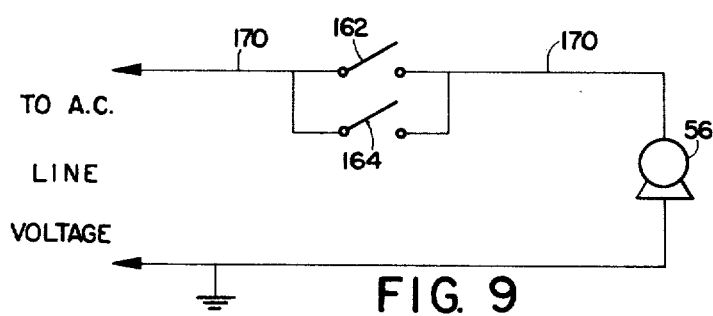

APPARATUS FOR BONDING A TRANSPARENT COVER SHEET TO A PHOTOGRAPH

BACKGROUND OF THE INVENTION

1. Field of the Invention

The present invention relates to the field of photography and, more particularly, to apparatus for laminating or bonding a transparent protective cover sheet to an image-bearing surface of a photograph.

2. Description of the Prior Art

The present invention provides an apparatus for bonding or laminating a transparent cover sheet to the image-bearing surface of a photograph or positive photographic print, preferably of the type prepared by a diffusion transfer process in a self-developing film unit.

The print may have a silver image (black and white) or a dye image (color), and the transparent cover sheet preferably is of the type having a thin layer of a fluid-activatable bonding agent on one side thereof which becomes wetted by an appropriate activating fluid during the course of the laminating process and is brought into face-to-face contact with the image-bearing surface of the print to effect the bond and thereby form a laminated structure.

With certain types of black and white self-developing film units, for example the type described in U.S. Pat. No. 2,543,181 issued on Feb. 27, 1951 to E. H. Land, it is recommended that the image bearing surface of the photograph should be "washed" and covered with a transparent layer soon after processing to improve long-term image stability. The "washing" (or cleaning) refers to applying a fluid to the surface under pressure, such as by gently wiping or rubbing, to remove or neutralize small amounts of residual processing composition which may tend to oxidize or otherwise adversely effect the silver image. The covering of the image bearing surface with a transparent layer improves image stability by substantially isolating the silver image from oxidizing agents that may be present in the atmosphere. For a representative example of a process wherein the image bearing surface of a photograph is "washed" and covered with a thin transparent plastic cover sheet to form a laminate, see U.S. Pat. No. 2,798,021 issued to E. H. Land on July 2, 1957.

In applications where the black and white or color photograph is used to form part of an identification card or I.D. credit card which includes, for example, an image of the bearer and other information thereon, the transparent cover serves as a tamperproof security seal in that after the cover sheet is bonded to the image-bearing surface it cannot be removed without damaging or destroying the image. In such applications, the cover sheet also serves to improve print stability when the photograph is produced from the previously described type of black and white film unit that requires such a post-processing protective covering. For representative examples of such identification card laminate structures, reference may be had to U.S. Pat. Nos. 3,313,052; 3,511,655; 3,581,416; 3,647,442; 3,644,116; and 3,827,726.

While the previously described laminates may be formed manually using a hand-held roller to distribute the activating fluid between the bonding agent layer of the cover sheet and the image-bearing surface of the superposed photograph while applying pressure to urge the two sheets into bonding contact (as suggested in U.S. Pat. No. 2,798,021), it is preferably to have a laminating apparatus or machine for automatically performing the laminating task in applications where there are large quantities of photographs or prints that require such protection.

U.S. Pat. Nos. 3,438,835 and 3,543,662 disclose apparatus for automatically laminating a transparent cover sheet to the image-bearing surface of a diffusion transfer print. The laminator includes a support member for rotatably mounting an elongated web roll of a transparent plastic material, having a fluid-activatable bonding agent on one side, which is fed between a pair of pressure rollers with a print having a "wet" image-bearing surface in facing relation to the bonding agent to form the laminate. The rollers also include a severing device for cutting the plastic web to separate the laminate from the web following the bonding operation.

While such apparatus function in a satisfactory manner, they do have the disadvantage of including a web-severing device which is subject to wear and must be serviced at regular intervals to insure that the cutting edges are sharp and properly aligned.

Therefore, it is an object of the present invention to provide a compact and simply constructed laminating apparatus for automatically laminating or bonding a transparent cover sheet to the image-bearing surface of a photograph or photographic print without requiring the severing or cutting of any of the materials used in the laminating process.

It is another object of the invention to provide an automatic laminating apparatus for bonding a transparent cover sheet having a fluid-activatable bonding agent on one side thereof to the image-bearing surface of a print wherein the activating fluid is applied to the image-bearing surface to provide some beneficial washing action of this surface to improve print stability by substantial removing or neutralizing residual processing composition therefrom if the same is present and/or to improve the quality of the laminate by removing dust or dirt from the surface.

Other objects will in part be obvious and will in part appear hereinafter.

SUMMARY OF THE INVENTION

The present invention provides an apparatus for automatically laminating or bonding a transparent cover sheet, having a fluid-activatable transparent bonding agent on one side thereof, to the image-bearing surface of a photograph or photographic print, preferably of the type prepared by a diffusion transfer process, to form a laminate.

Rather than utilizing an elongated web roll of such cover sheet material and requiring a cutting or severing device to separate each successive laminate from the web, the apparatus embodying the present invention preferably includes means for holding a stack of individual cover sheets precut to the proper dimensions and means for advancing a cover sheet from one end of the stack into the bite of a pair of pressure-applying means, such as a pair of pressure rollers, simultaneously with a photograph being advanced into the bit such that the photograph and the cover sheet advance between the rollers in proper superposed relation.

In a preferred embodiment the apparatus includes means for holding a plurality of transparent cover sheets arranged in stacked relation, means for providing a fluid treating station where the image-bearing surface of a photograph being advanced relative to the fluid treating station is adapted to be wetted and washed with a fluid for activating the bonding agent on a cover sheet, pressure-applying means including a pair of pressure-applying rollers for advancing a photograph and cover sheet relative thereto to bring them into superposition while simultaneously applying a compressive pressure thereto to urge the wetted image-bearing surface of the photograph and the layer of bonding agent on the cover sheet into contact thereby activating the bonding agent to effect the bond and form a laminate; means for advancing a photograph relative to the fluid treating station and into operative relation with the pressure-applying rollers whereby the image-bearing surface is wetted and washed and the forward end of the photograph is located in operative engagement with the bite of the pressure-applying rollers; and means for advancing a cover sheet from one end of the stack into operative relation with the pressure-applying rollers to locate the forward end of the cover sheet in operative engagement with the bite of the pressure-applying rollers substantially simultaneously with the forward end of the photograph such that the photograph and cover sheet are advanced together and are brought into superposition by the pressure-applying rollers. The apparatus is preferably configured for automatic operation and further includes drive means, including an electrical motor, for operatively driving at least one of the pressure-applying rollers, the photograph advancing means and the cover sheet advancing means and control means for controlling the automatic operation of the apparatus.

Advantageously, the apparatus applies the activating fluid to the image-bearing surface with a wiping action to "wash" and wet it. As noted earlier, the "washing" or cleaning of the image-bearing surface tends to improve image stability by removing or neutralizing residual processing composition in certain types of black and white self-developing film units requiring such post-processing treating. The "washing" action is also beneficial for other types of black and white film units and color film units in that dust or dirt is removed therefrom thereby tending to improve the quality of the bond between the cover sheet and photograph.

The thin cover sheet generally is formed of a plastic material having the layer of bonding agent coated on one side thereof. When the cover sheets are arranged in stacked relation, there may be some difficulty in sliding the end cover sheet off of the stack without also moving the next underlying cover sheet with the end sheet because of static charge attractive forces that tend to accumulate on such plastic materials. It has been found that the problem of advancing more than one cover sheet at a time from the stack may be substantially eliminated by providing means operatively associated with the cover sheet advancing means for advancing the forwardmost cover sheet in the stack while deflecting the forward end of the forwardmost cover sheet toward the bite of the pressure-applying rollers and simultaneously deflecting the forward ends of the remaining cover sheets in the stack away from the bite of the pressure-applying rollers to facilitate the sliding motion of the forwardmost cover sheet relative to the stack and thereby help prevent more than one cover sheet at a time from being fed into the bite of the pressure-applying rollers.

BRIEF DESCRIPTION OF THE DRAWINGS

For a fuller understanding of the nature and objects of the invention, reference should be had to the following detailed description taken in connection with the accompanying drawings wherein:

FIG. 6 is a schematic view of a cover sheet deflecting and advancing device with the stack of cover sheets shown in a deflected condition and the path of travel of the forwardmost sheet in the stack to the bite of the pressure-applying rollers shown in dotted lines;

FIG. 7 is a schematic view of an electrical switch that is actuated in response to inserting a photograph into operative relation with the apparatus;

FIG. 8 is a schematic view of a second electrical switch shown in operative relation with a timing cam on the rotatably driven cover sheet advancing device; and FIG. 9 is a schematic electrical circuit diagram showing the first and second switches connected in parallel between a drive motor and a connection to a source of AC line voltage.

DESCRIPTION OF THE PREFERRED EMBODIMENT

Figure 1:
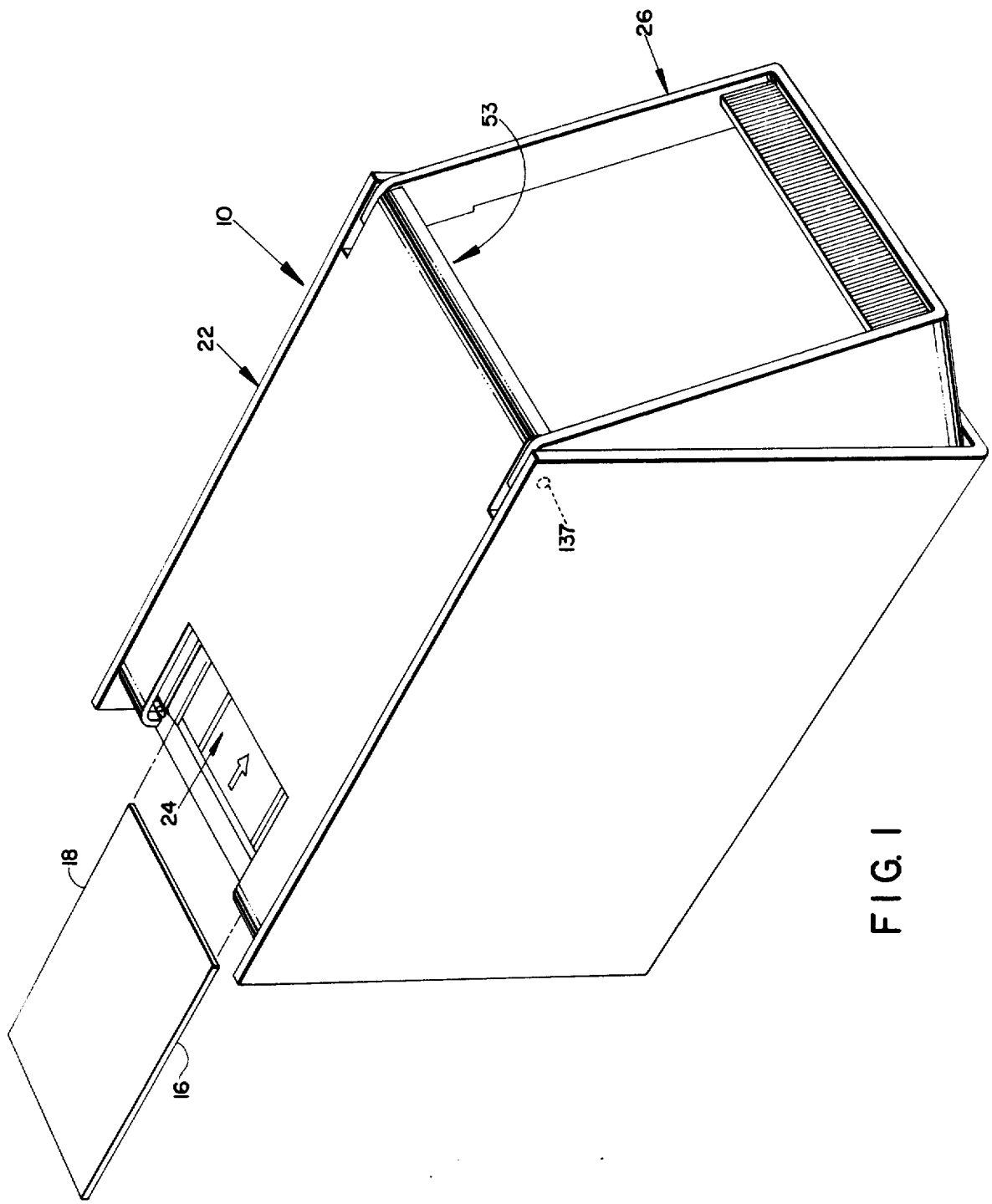
FIG. 1 is a perspective view of an apparatus, embodying the present invention, for bonding or laminating a transparent cover sheet to the image-bearing surface of a photograph.
Figure 2:
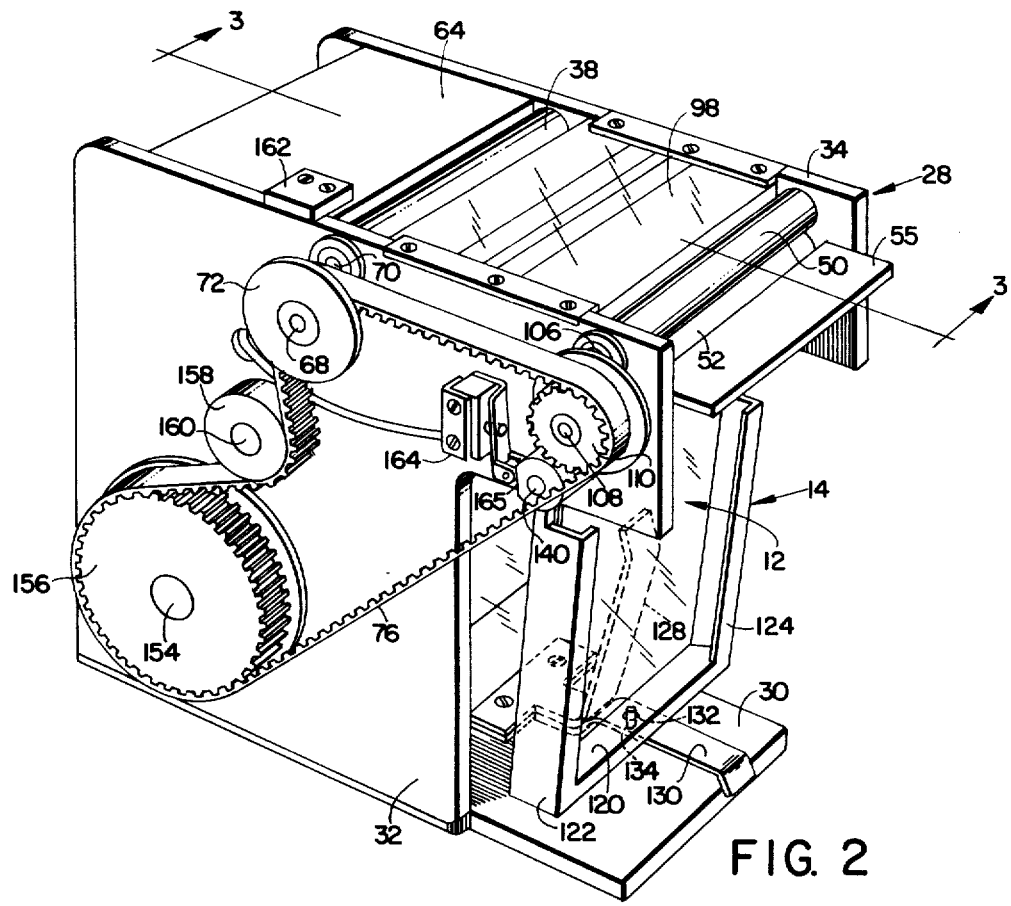
FIG. 2 is a perspective view of the apparatus of FIG. 1 with its exterior housing removed to show its interior structure and arrangement of components.
Figure 4:
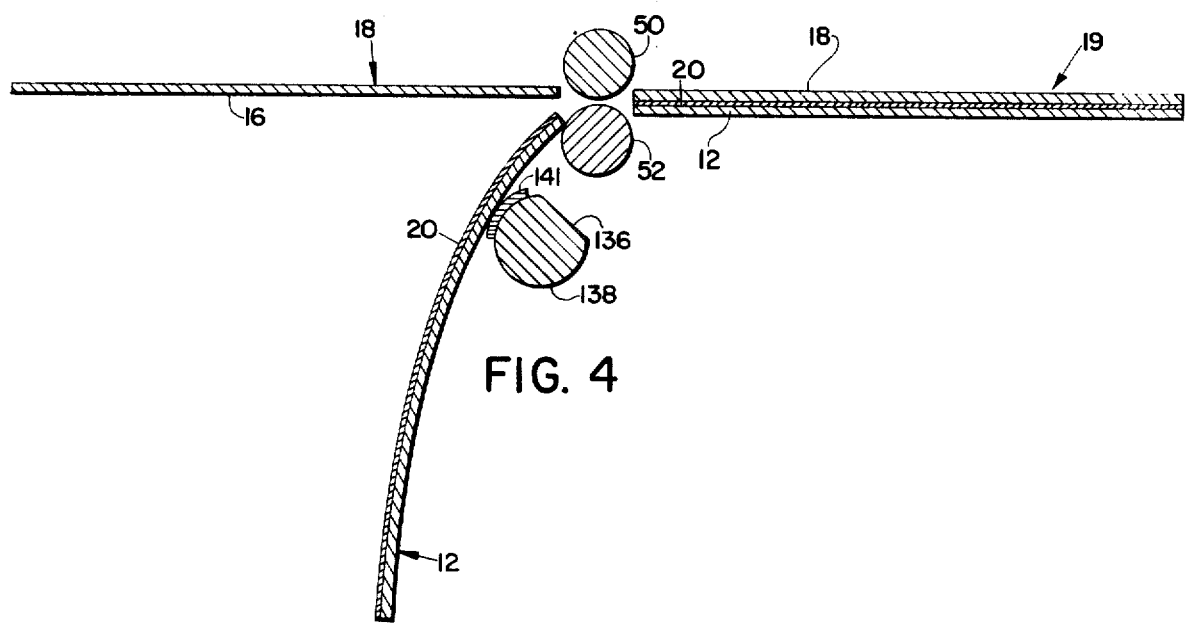
FIG. 4 is a schematic sectional view of a photograph and cover sheet about to be advanced into the bite of a pair of pressure-applying rollers and a laminate formed by the photograph and cover sheet shown on the exit side of the rollers.

With reference to FIGS. 1, 2 and 4 of the drawings, there is shown an automatic laminating apparatus 10 for laminating or bonding a transparent plastic cover sheet 12, supplied from a cassette 14 holding a plurality of cover sheets 12, to the image-bearing surface 16 of a photograph or photographic print 18, preferably of the type prepared by a diffusion transfer process in a self-developing film unit, to form a laminate 19.

The photographic print 18 may have a silver image (black and white) or a dye image (color) and the transparent cover sheet 12 preferably includes a layer 20 (see FIG. 4) of a transparent fluid activatable bonding agent which becomes wetted during the laminating process and is brought into face-to-face contact with the image-bearing surface 16 of print 18 to effect the bond therebetween and thereby form the laminated structure 19.

Black and white images may be obtained in accordance with silver transfer procedures described and claimed, for example, in U.S. Pat. Nos. 2,543,181 and 2,647,056 issued to E. H. Land. As described in these patents, the self-developing film unit includes a negative sheet having at least one photosensitive layer thereon which is photoexposed to form a latent image therein; a positive sheet including an image-receiving layer that is positioned in facing relation to the photosensitive layer; and a fluid processing composition that is spread between the two sheets to initiate a development and diffusion transfer process, after which the positive sheet having the positive silver image thereon is separated from the negative sheet. The photoexposed photosensitive layer of silver halide emulsion is developed with an aqueous alkaline processing composition including a silver halide developing agent and a silver halide solvent; as a function or development an imagewise distribution of a soluble silver complex is formed in terms of unexposed areas of the emulsion and then is transferred to the superposed silver receptive layer of the positive sheet where it is reduced to impart thereto a positive silver transfer image.

Color transfer images may be obtained in accordance with the procedures described, for example, in U.S. Pat. No. 2,983,606 issued to Howard G. Rogers. A photosensitive sheet or element including one or more light-sensitive silver halide emulsions each having associated therewith a dye developer (a dye which is also a silver halide developing agent) is exposed and developed with an aqueous alkaline processing composition; as a function of development, an imagewise distribution of diffusible dye is formed; and this imagewise distribution is then transferred to a superposed dyeable stratum of the positive sheet to impart thereto a positive dye transfer image. After such processing the positive sheet is separated from the negative sheet to reveal the positive dye image on the image-bearing surface 16 of such a print 18.

The transparent cover sheet 12 may be formed of rigid or semi-rigid vinyls having on one surface thereof a layer 20 of a transparent bonding agent formed by a hydroxylated polymer, for example, polyvinyl alcohol having a hydrolyzed surface so that the normally dry layer 20 may be activated by the application of a fluid, for example, water or suitable aqueous solutions that are known in the art.

With the activated layer 20 in facing relation to the image-bearing surface 16 of print 18, the bonding or laminating is facilitated by applying a compressive pressure to the superposed cover sheet 12 and print 18. High pressure is not required to form the desired bond. The main function of the pressure is to expel any trapped air and/or excess fluid from between the exterior surface of layer 20 and an image-bearing surface 16 of print 18.

For representative examples of transparent cover sheets 12, the fluid activatable bonding agent 20 thereon, and fluids suitable for activating the bonding agent, reference may be had to U.S. Pat. Nos. 2,798,021; 3,511,655; 3,644,116; 3,647,442; and 3,827,726, and copending commonly assigned application Ser. No. 654,220 filed on Feb. 2, 1976 by W. T. MacLeish et al. (now U.S. Pat. No. 4,115,618).

As noted earlier, the transparent cover sheet 12 may serve as a stability improving protective layer for isolating the silver image of certain types of black and white film units from oxidizing agents in the atmosphere or it may serve to provide a tamperproof seal that prevents alterations of identification and I.D. credit cards fromed in part by the print 18 because after lamination, the cover sheet 12 may not be removed without damaging or destroying the image on surface 16 of print 18.

Referring once again to FIGS. 1 and 2 of the drawings, laminating apparatus 10 includes a box-like exterior housing 22 which defines in part an entrance opening 24, at one end of apparatus 10, through which a print 18 is inserted manually by the user and a pivotally mounted receptacle 26 at the opposite end for receiving a laminate 19 which is automatically ejected thereinto, through an exit opening, following the bonding operation.

Figure 3:
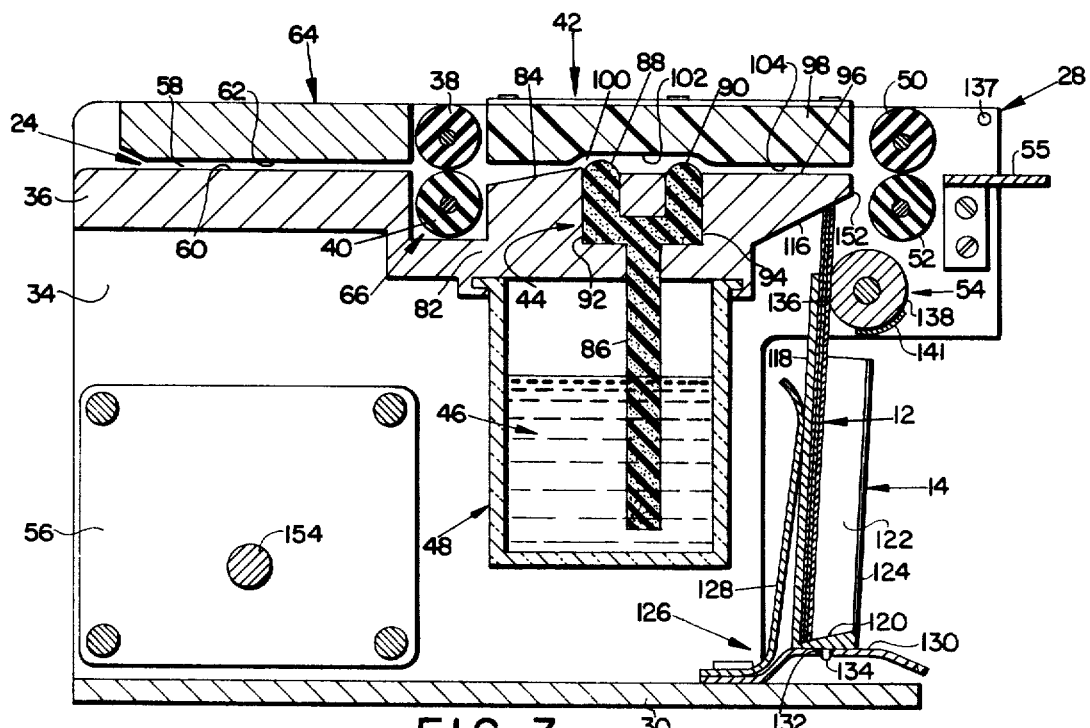
FIG. 3 is a side elevational view, partly in section, of the apparatus of FIG. 2 taken along line 3—3.

As best shown in FIGS. 2 and 3 housing 22 covers an internal support or component mounting frame 28 formed by a horizontal bottom or base plate 30, a pair of upstanding side wall members 32 and 34 and an upper wall member or platform 36 extending between side wall members 32 and 34 and being located below the top edge of these side wall members in substantially parallel spaced relation to base plate 30.

As will be described in detail hereinafter, the laminating apparatus 10 includes a pair of rollers 38 and 40, which are adapted to be rotatably driven in response to a print 18 being inserted through print entrance opening 24 with its image-bearing surface 16 facing downwardly toward platform 36, for operatively engaging and advancing print 18 relative thereto from its initial insertion position past a fluid treating or application station 42 where an applicator 44 wets and washes the image-bearing surface 16 with a bonding agent activating fluid 46, such as water supplied from a holding or storage tank 48, and into the bite of a pair of pressure-applying rollers 50 and 52. As the print 18 is being advanced past station 42 and towards the pressure-applying rollers 50 and 52, the forwardmost transparent cover sheet 12 in cassette 14 is engaged by a rotatably driven cover sheet advancing or feeding device 54 which advances it from cassette 14 into the bite line of rollers 50 and 52. The operation of device 54 is coordinated with the operation of rollers 38 and 40 so that the leading or forward end of the cover sheet 12 is advanced into operative relation with pressure rollers 50 and 52 substantially simultaneously with the leading end of print 18. The rollers 50 and 52 advance the print 18 and the cover sheet 12 relative thereto to bring print 18 and sheet 12 into superposition with bonding agent layer 20 of sheet 12 in facing relation to the "wetted" surface 16 of print 18 while at the same time applying a compressive pressure to these two elements to urge the wetted surface 16 and the bonding agent layer 20 into contact whereby the bonding agent is activated to establish the bond forming laminate 19. The laminate 19 emerges from rollers 50 and 52 and is advanced thereby into receptacle 26 through an exit opening 53 defined in part by plate 55. As will be described later, the means for rotatably driving the print advancing rollers 38 and 40, the pressure-applying rollers 50 and 52 and the cover sheet advancing device 54 includes an electrical motor 56 and its associated drive coupling system.

As best shown in FIG. 3, the print entrance opening 24 communicates with a print guiding passageway 58 that is aligned with the bite of rollers 38 and 40 and is defined by an upper surface 60 at the left end (as viewed in FIG. 3) of platform 36 and the underside or surface 62 of a guide block 64 positioned over surface 60 and extending between and being secured at its opposite sides to side wall members 32 and 34.

The print advancing means or rollers 38 and 40 are rotatably mounted in juxtaposition between side wall members 32 and 34 with the bite of the rollers 38 and 40 in alignment with print passageway 58. A trough or depression 66 is provided in platform 36 to accommodate the lower roller 40 which rotates on an axial shaft 68 (see FIG. 5) that extends through and beyond suitable bearings (not shown) in side walls 32 and 34. The upper roller 38 rotates on its axial shaft 70 which extends into suitable bearings (not shown) in side wall members 32 and 34.

Figure 5:
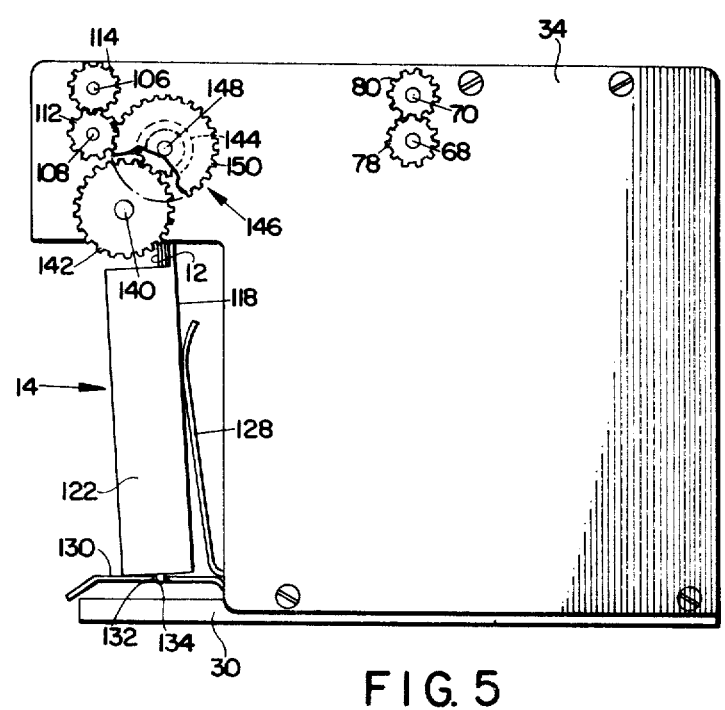
FIG. 5 is an elevational view of the apparatus of FIG. 2 showing the operative position of a cassette holding a stack of cover sheets and also showing details of a speed reduction gear train interconnecting certain components of the apparatus.

As best shown in FIGS. 2 and 5, a portion of the lower roller axial shaft 68 extends outwardly beyond side wall member 32 and has a toothed wheel 72, fixedly secured thereto, which is in meshed engagement with a later-to-be-described toothed drive belt 76.

Fixedly secured to the opposite end of axial shaft 68 that extends outwardly beyond side wall member 34 is a mangle gear 78 that is in mesh with an identical mangle gear 80 fixedly secured to an extension of the upper roller shaft 70 thereby gearing the rollers 38 and 40 together for simultaneous rotation in opposite direction in response to the drive belt 76 rotating the lower roller 40 through its coupling to toothed wheel 72.

The rollers 38 and 40 may be formed of any suitable metal or plastic material and are provided with print engaging surfaces which are effective to frictionally engage the opposite sides of print 18 and advance it therebetween, past fluid treating station 42, and into the bite of pressure rollers 50 and 52.

The fluid treating station 42, located between the print advancing rollers 38 and 40 and the pressure-applying rollers 50 and 52, is defined by a portion 82 of platform 36 having an integrally formed ascending print guide ramp 84 located in the path of travel of a print 18 emerging from the exit side of rollers 38 and 40; the fluid holding tank 48 located below portion 82 of platform 36; the fluid applicator 44 having one end 86 operatively associated with and extending down into the fluid 46 in tank 48; and a pair of integrally formed applicator heads 88 and 90 seated in a pair of elongated slots 92 and 94 in platform portion 82; a print guide surface 96 defined by the upper surface of platform 36, and a print guide block 98 mounted between side wall members 32 and 34 in overlying spaced relation to guide ramp 84, the fluid applicator heads 88 and 90 and platform surface 96.

The tank 48 is formed of any suitable material, such as plastic, that is compatible with the type of fluids 46 that are to be held therein. In most instances the fluid 46 will be water. The applicator 44 may be formed of any suitable resiliently deformable fluid absorbing and wicking material such as foam rubber or appropriate synthetic foam materials, for example, a compressed fine pore cellulose sponge.

In operation, rollers 38 and 40 advance the print 18 therebetween (to the right as viewed in FIG. 3). The ramp 84 and the underside surface of guide block 98 aligned thereover define a guide channel 100 that the print 18 follows to bring its image-bearing surface 16 into contact with the slightly raised applicator heads 88 and 90. The guide block 98 includes a concave surface 102 on its underside over heads 88 and 90 which defines an arcuate section of channel 100 which print 18 follows. The spacing between surface 102 and heads 88 and 90 is dimensioned such that the print 18 depresses the resilient heads 88 and 90 slightly as it passes over them in sliding pressure contact so that they are urged into positive contact with print surface 16 during fluid application. This inherent biasing force of heads 88 and 90 also insures that they wipe surface 16 as it passes thereover so as to remove or dissolve any residual processing composition regents that may be left on surface 16. That is, the heads 88 and 90 not only apply the fluid 46 to print surface 16 but they also provide a washing and/or wiping function to substantially reduce or remove any chemical or other contaminents such as dust or dirt on surface 16.

It will be noted that the ramp 84 and concave surface 102 define a smooth arcuate path of travel for the print 18 over heads 88 and 90 so that the leading edge of print 18 does not become engaged with the upstanding portions of the heads 88 and 90 thereby preventing print 18 from becoming jambed in the fluid-applying station 42. The guide block 98 serves as guide means for guiding print 18 whereby surface 16 engages and resiliently deforms heads 88 and 90.

After passing over the fluid-applying and image-bearing surface wetting and washing heads 88 and 90, the print 18 follows a linear extension of channel 100 that is aligned with the bite of pressure-applying rollers 50 and 52 and is defined by surface portion 96 of platform 36 and the underside surface 104 of guide block 98 thereover.

While the illustrated embodiment of applicator 44 is shown to have two fluid-applying heads 88 and 90 to insure complete wetting and washing of print surface 16, it will be understood that applicator 44 may be provided with only one fluid-applying head or conversely with more than two heads without departing from the inventive concepts herein described.

The spacing between the print advancing means (rollers 38 and 40) and the pressure-applying means (rollers 50 and 52) is preferably dimensioned such that the forward end of print 18 is inserted into operative engagement with the bite of rollers 50 and 52 by rollers 38 and 40 just before the trailing end of print 18 becomes disengaged therefrom.

The pressure-applying rollers 50 and 52 are mounted for rotation by their respective axial shafts 106 and 108 which extend through suitable bearings (not shown) in side wall members 32 and 34 (see FIGS. 2 and 5).

The lower roller 52 has a toothed wheel 110, fixedly secured to a portion of axial shaft 108 extending outwardly beyond side wall member 32, which is engaged with toothed drive belt 76. Fixedly secured to the opposite end of shaft 108 that extends outwardly beyond side wall member 34 is a mangle gear 112 that is in mesh with an identical mangle gear 114 fixedly secured to shaft 106 of roller 50. In this manner rollers 50 and 52 are coupled together for simultaneous rotation in opposite directions in response to belt 76 rotatably driving roller 52 through toothed wheel 110.

The pressure rollers 50 and 52 may be formed of any suitable metal or plastic material and include laminate engaging surfaces that frictionaly engage the print 18 and cover sheet 12 to advance them relative thereto while applying a compressive pressure to urge the wetted surface 16 of print 18 into operative contact with the layer 20 of bonding agent on cover sheet 12 to effect bonding. The pressure applied by rollers 50 and 52 need not be great to insure proper bonding but it is preferably sufficient to cause the expulsion of trapped air and excess fluid 46 from between surface 16 and layer 20.

As noted earlier, the cover sheets 12 are preferably provided in a holding cassette 14 configured to hold a plurality (for example, 75–100) of cover sheets 12 in stacked relation therein. The cassette 14 is positioned to the right (as viewed in FIG. 3) of tank 48 below an upwardly inclined cover sheet guide ramp or guide surface 116 on the underside of platform 36 which serves to deflect the upper end of the forwardmost cover sheet 12 toward the bite of pressure-applying rollers 50 and 52 when the forwardmost cover sheet 12 is initially advanced upwardly relative to the underlying cover sheets 12 remaining in the stack by cover sheet advancing device 54 and for guiding the forwardmost cover sheet 12 along a path of travel to insert the forward end of the advanced cover sheet into the bite of rollers 50 and 52 substantially simultaneous with the forward end of a photograph or print 18 advanced by rollers 38 and 40.

The cassette 14 is a partially open box-like structure defined by a back wall 118 that is shorter in height than the length or height of the cover sheets 12, a bottom wall 120 that joins the bottom edge of back wall 118 and is inclined upwardly therefrom (to the right as viewed in FIG. 3) so that its upward slope is in the same direction as the upward slope of the cover sheet guide ramp or surface 116, a pair of side walls 122 joining the lateral edges of back wall 118 and bottom wall 120 and being shorter than back wall 118 and a forward cover sheet retaining lip 124 extending inwardly from the forward edges of side walls 122 and upwardly from the forward edge of bottom wall 120. The cassette 14 may be part of apparatus 10 or it may be of the disposable type provided with each new supply of cover sheets 12. The cover sheets 12 are stacked in cassette 14 with their layer 20 of bonding agent facing cassette back wall 118. It will be noted that the upper forward ends of cover sheets 12 extend upwardly beyond the top edge of cassette back wall 118.

Mounted on the base plate 30 of frame 28, to the right of tank 48 as viewed in FIG. 3, is a generally L-shaped cassette biasing and mounting spring 126 defined by an elongated upstanding section 128 which engages the back wall 118 of cassette 14 and is prestressed to provide a biasing force thereon in a direction away from tank 48 (to the right in FIG. 3 and to the left in FIG. 5) and a relatively short generally horizontal section 130 having its major portion located in spaced relation to base plate 30 and having an oversized hole 132 therein for releasably receiving a centrally disposed pin 134 secured to and depending from the underside of cassette bottom wall 120. Spring section 130 is prestressed to provide an upward biasing force on cassette 14 so that top edges of the cover sheets 12 are urged into conforming sloping engagement with the upwardly sloping cover sheet guide ramp 116.

As best shown in FIG. 3, the cassette 14 is operatively positioned in apparatus 10 with its bottom wall 120 resting on spring member 130 with pin 134 located in hole 132 and spring member 128 in engagement with back wall 118 urging cassette 14 and the stack of cover sheets 12 therein to the right so that a forward surface portion of the upper or forward end of the forwardmost cover sheet 12, that extends above the cassette side walls 122, rests against a flat surface 136 of cover sheet advancing device 54. As noted before, the horizontal spring section 130 urges cassette 14 upwardly so that the top edges of the cover sheets 12 are urged into engagement with surface 116 and assume a slope conforming thereto as allowed by the upwardly inclined slope of cassette bottom wall 120 on which the bottom edges of the cover sheets 12 rest.

It will be noted that by mounting cassette 14 in this manner, the cassette 14 and the stack of cover sheets 12 therein may be pivoted about two mutually perpendicular axes. First it may pivot about a horizontal axis passing through the coupling point of pin 134 and hole 132 in a direction normal to the sheet on which FIG. 3 is drawn so that the upper end of the cassette 14 and stack of cover sheets 12 may be moved toward and away from the pressure rollers 50 and 52 in the directions of the arrow in FIG. 6. It will be noted that when spring 128 urges the stack into bearing relation with flat surface 136, the stack is located in the initial or operative position wherein the stack is tilted from the vertical (i.e., the top of the stack is to the right of a vertical line normal to base plate 30). The reason for this initial tilt and the ability to pivot or deflect the stack about the horizontal axis is related to facilitating the advancement of a cover sheet from the end of the stack and to prevent more than one cover sheet at a time from being advanced by device 54 as will be explained in detail later.

Cassette 14 also may pivot somewhat about an axis that is parallel to the back wall 118 and passes through pin 134 and hole 132. That is, cassette 14 may swivel about pin 134 over the surface of spring section 130 to properly align the stack of cover sheets 12 with respect to the bite line of pressure rollers 50 and 52.

The flat surface 136 of device 54 against which the stack of cover sheets 12 rests in bearing relation is located in substantially parallel relation to the bite of pressure rollers 50 and 52. That is, if the stack of cover sheets 12 is aligned such that the forward surface of the forwardmost cover sheet 12 is flush against surface 136 over the entire width of the cover sheet 12, then it will advance into the bite of rollers 50 and 52 squarely without one of the two lateral edges lagging behind. In some instances, the thickness of the bonding agent layer 20 on the cover sheets 12 may vary over the width of the cover sheets. If one lateral edge of the cover sheet is thicker than the opposite edge, the stack of cover sheets 12 in cassette 14 will not maintain a parallel relation with back wall 118 but will be skewed with respect to wall 118. By mounting cassette 14 so that it may pivot about the longitudinal axis, the stack of cover sheets 12 and cassette 14 may pivot under the influence of spring section 128 so as to locate the forward surface portion of the forwardmost cover sheet 12 flush against surface 136 and thereby automatically align the forwardmost cover sheet 12 in operative alignment with the bite of pressure-applying rollers 50 and 52.

Access for inserting and withdrawing cassette 14 is provided by pivoting the laminate retainer 26 of housing 22 in a counterclockwise manner about a hinge pin 137 thereby unblocking an open end of housing 22 adjacent the operative position of cassette 14. To load cassette 14, its top end is tilted rearwardly towards tank 48 and is inserted up and behind surface 136 thereby deflecting spring member 128 to the left. The bottom end is then pivoted rearwardly so bottom wall 120 slides over the upper surface of spring member 130 until pin 134 snaps into hole 132. To withdraw cassette 14 it is grasped by its side walls 122 and held steady while the outboard end of spring member 130 is depressed manually by the user to disengage member 130 from pin 134. Then the lower end of cassette 14 may be pivoted outwardly to withdraw it from its operative position. With cassette 14 removed, the spring member 128 may be deflected downwardly to provide access to tank 48 which is preferably releasably mounted on slide rails (not shown) on the interior surface of side wall members 32 and 34 so that it may be removed from the support frame 28 to replenish the supply of activating fluid 46.

The cover sheet advancing device 54 includes a partially cylindrical roller member 138 having the flat surface 136 thereon extending the length of member 138 and including an axial shaft 140 which extends through bearings (not shown) in side walls 32 and 34 for rotatably mounting device 54 on support frame 28. Mounted on the underside of the cylindrical portion of member 138 (as it is viewed in FIG. 3) is a cover sheet engaging friction pad 141 formed of a high friction nonabrasive material such as neoprene rubber or the like.

As best shown in FIG. 5, a portion of axial shaft 140 of device 54 extends outwardly beyond side wall member 34 and has a gear 142 fixedly secured thereto. Gear 142 has its teeth in mesh with the pinion portion 144 of a compound gear 146 mounted for rotation about an axial pin or stud 148 extending outwardly from side wall member 34. The larger gear portion 150 of compound gear 146 is in mesh with the mangle gear 112 on the end of the lower driven pressure roller 52. Thus the cover sheet advancing device 54 is rotatably driven through this speed reduction gear train in response to rotation of pressure roller 52.

As will become apparent hereinafter, device 54 is adapted to be rotatably driven through only one complete revolution during the course of a complete laminating cyle of operation of apparatus 10 so as to perform a timing and control function and insure that the device 54 is always returned to its initial position (shown in FIG. 3) at the end of each cycle.

As best shown in FIG. 3, with device 54 in its initial position the flat surface 136 faces tank 48 and the upper end of the forwardmost cover sheet 12 is urged into bearing relation to surface 136 by spring member 128 acting on cassette 14. The top edges of the cover sheets 12 are positioned in engagement with the guide ramp 116 which slopes upwardly to the right towards the bite of pressure-applying rollers 50 and 52.

As best shown in FIGS. 3 and 6, in response to the initial rotation of device 54 in a clockwise direction about its axial shaft 140, the flat surface 136 begins to become disengaged from the forward surface of the forwardmost cover sheet 12 in cassette 14 as the cylindrical portion of roller member 138, between surface 136 and pad 141 engages this surface of the cover sheet 12. Because the cylindrical portion is located at a greater radial distance from axial shaft 140 than is the center of the flat surface 136, the cylindrical portion pushes the upper end of the stack of cover sheets 12 rearwardly (to the left as viewed in FIGS. 3 and 6) causing the stack and cassette 14 to pivot in a counterclockwise direction about the point of engagement of pin 134 with spring member 130. It will be noted that the cylindrical portion slides rather easily over the surface of the forwardmost cover sheet 12 and applies a minimal upwardly directed friction force thereto. This initial engagement by the cylindrical portion mainly deflects the upper end of the entire stack rearwardly so that the top edges of the cover sheets 12 slide to the left downwardly along guide surface 116.

As device 54 continues to rotate in the clockwise direction the leading edge of pad 141 frictionally engages the forward surface of the forwardmost cover sheet 12 and applies a sufficiently strong upward force thereto to cause it to slide upwardly relative to the next underlying or second cover sheet 12 in the stack. The upward movement causes the guide ramp 116 to deflect the forward end of the forwardmost cover sheet to the right toward the bite of rollers 50 and 52. As the device 54 continues to rotate and the central portion of pad 141 becomes engaged with the forwardmost cover sheet two things happen. The pad continues to apply the upward advancing force on the forwardmost cover sheet 12 but at the same time it deflects the upper forward ends of the remainder of cover sheets 12 in the stack further rearwardly because the engaging surface of pad 141 is at a greater radial distance from axial shaft 140 than is the cylindrical portion of member 138 or the center of flat surface 136. Therefore cover sheet advancing device 54 in cooperation with guide surface 116 deflects the upper or forward end of the forwardmost cover sheet 12 toward the bite of the pressure-applying rollers 50 and 52 while at the same time it deflects the upper or forward ends of the remaining cover sheets 12 in the stack in the opposite direction, away from the bite of rollers 50 and 52.

As device 54 continues to rotate, the pad 141 advances the forward end of the forwardmost cover sheet into the bite of pressure-applying rollers 50 and 52 (as shown by the dotted line in FIG. 6) substantially simultaneously with the forward end of a photograph 18. The pad 141 then becomes disengaged from the forwardmost cover sheet 12 and completes its single revolution thereby positioning flat surface 136 in facing relation to the stack of cover sheets 12 whereby the stack and cassette 14 pivot in a clockwise position back to the initial position under the influence of spring section 128.

It is believed that the deflecting of the forward end of the forwardmost cover sheet toward the bite of the rollers and deflecting the forward ends of the remaining cover sheets 12 in the stack in the opposite direction, away from the forward end of the forwardmost cover sheet 12, helps to overcome the influence of electrostatic attractive forces that tend to build up in such a stack of thin plastic sheets and thereby facilitates the sliding of the forwardmost cover sheet 12 over the next underlying cover sheet so that device 54 only feeds one cover sheet 12 at a time into the bite of rollers 50 and 52. It will be noted that the upwardly inclined guide surface 116 also serves as a stop member against which the top edges of the remaining cover sheets 12 in the stack abut to help prevent them from sliding upwardly along with the forwardmost cover sheet 12.

As will become apparent, the photograph or photographic print 18 is advanced along a first path of travel from an initial or inserted position past fluid treating station 42 and into operative relation with rollers 50 and 52 whereby the forward or leading end of print 18 is located in operative engagement with the bite of rollers 50 and 52 and the forwardmost cover sheet 12 in cassette 14 is advanced along a second path of travel which is substantially normal or perpendicular to and converges with the first path so that its forward end is located in operative engagement with the bite of rollers 50 and 52 at substantially the same time as forward end of print 18 whereby the print 18 and cover sheet 12 are advanced together relative to rollers 50 and 52 bringing them into operative superposition to form laminate 19.

As best shown in FIGS. 2 and 3, the drive means for rotatably driving the photograph advancing rollers 38 and 40, the pressure-applying rollers 50 and 52 and the cover sheet advancing device 54 includes the electrical motor 56, mounted on base plate 30 to the left of tank 48 (as viewed in FIG. 3, the drive belt 76, and the compound gear 146 coupling the cover sheet advancing device 54 to the lower pressure roller 52.

The electrical motor 56 is preferably of the type including an electromagnetic or mechanical brake that is effective to brake rotation of the motor's output shaft 154 in response to deenergizing or shutting off the motor. Such self-braking motors are well known in the art and will not be described further herein.

As best shown in FIG. 2, the output shaft 154 of motor 56 extends through and outwardly beyond side wall member 32 and has a toothed power output wheel 156 fixedly secured thereto. The motor 56 is coupled to the lower print advancing roller 40 and the lower pressure-applying roller 52 by means of the toothed drive belt 76 which is formed in an endless loop passing around portions of wheel 156, an idler wheel 158 mounted on a stud 160 on side wall member 32, toothed wheel 72 on axial shaft 68 of roller 40 and the toothed wheel 110 coupled to shaft 108 of the lower pressure roller 52. The idler wheel 158 is provided to increase the areas of contact of belt 76 with toothed wheels 156 and 72.

In a preferred embodiment of the invention, apparatus 10 also includes means for controlling the automatic operation of apparatus 10 as it proceeds through a laminating or bonding cycle of operation. With reference to FIGS. 2, 7, 8 and 9, the control means includes a first electrical switch 162 responsive to insertion of a print 18 into an operative position relative to print advancing rollers 38 and 40 for energizing or connecting motor 56 to a source of AC line voltage; a second switch 164 and a single revolution timing cam 165 fixedly coupled to a portion of the shaft 140 of device 54 extending outwardly beyond side wall 32 for "latching" the power connection of motor 56 to the source of AC line voltage just before the print 18 that actuates switch 162 is disengaged therefrom and for disconnecting the motor 56 from the voltage source to end the laminating cycle.

As best shown in FIGS. 7, 8 and 9, the first switch 162 is a normally open or non-conducting electrical switch having an actuating lever 166 positioned in the path of travel of a print 18 being inserted in operative engagement with rollers 38 and 40. As shown in FIG. 7, the top roller 38 is provided with a reduced end diameter portion 168 adjacent side wall member 32 to accommodate the end of lever 166. As a print 18 is inserted into the bite of rollers 38 and 40, it engages and displaces the lever 166 upwardly to actuate switch 162 whereby it switches from its nonconducting to its conducting state to electrically connect motor 56 to a source of AC line voltage over line 170 (see FIG. 9). Switch 162 remains in its conducting state until the print 18 becomes disengaged from actuating lever 166 due to its advancement by rollers 38 and 40 whereupon switch 162 returns to its open or nonconducting state.

As best shown in FIG. 8, the second electrical switch 164, mounted on side wall member 32, includes an actuating lever 172 having its free end in operative engagement with the periphery of the single revolution timing cam 165. At the initial position of cam 165 the end of lever 172 is engaged with a flat face 174 of cam 165 that permits the lever 172 to assume its nonconducting position. In response to the rotation of cam 165 with device 54 in a clockwise direction, the free end of lever 172 is moved to the left (as viewed in FIG. 8) as it follows the periphery of cam 165 from the flat portion 174 to the cylindrical portion 176 of cam 165 which is located at a greater radial distance from the center of cam 165 than is the center of the flat face 174. This movement of lever 172 to the left switches switch 164 from its nonconducting to its conducting state just before print 18 becomes disengaged from lever 166 of switch 162 causing it to switch back to its nonconducting state.

As best shown in FIG. 9, switch 164 is connected in parallel to switch 162 and serves to "latch" the connection of motor 56 to the AC line voltage source so that the motor 56 keeps running even though the initial switch 162 switches from the conducting to the nonconducting state in response to the print 18 becoming disengaged from lever 166 upon being discharged from rollers 38 and 40.

As the print 18 and cover sheet 12 advance between pressure rollers 50 and 52, the lever 172 continues to follow the cylindrical portion 176 of cam 165 thereby maintaining the motor 56 in the energized condition. Upon the ejection of the laminate 19 from the exit side of the rollers 50 and 52, the cam 165 completes its single revolution, the free end of switch lever 172 returns to the flat face 174 of cam 165 thereby opening switch 164 and deenergizing motor 56 which is then automatically braked by the electromagnetic brake so that cam 165 and the cover sheet advancing device 54 stop at the initial position in preparation for the next laminating cycle.

It will be noted that for each single revolution of device 54 and its associated timing cam 165, the print advancing rollers 38 and 40 and the pressure applying rollers 50 and 52 are driven through approximately 5.5 revolutions to transport the print 18 over the fluid applying station 42 and to transport the superposed print 18 and cover sheet 12 between rollers 50 and 52 to form laminate 19.

In operation, the pivoting laminate receptacle 26 is pivoted to the open position to visually check that there is adequate fluid 46 in tank 48 and that there are a sufficient number of cover sheets 12 in cassette 14 for the laminating task at hand. The receptacle 26 is then returned to its operative closed position.

To begin the laminating cycle, the user manually inserts a print 18 (with surface 16 facing downwardly) forward end first through opening 24 and along the guide channel 58 until the forward edge of the print 18 engages and displaces or lifts the lever 166 of switch 162 adjacent the bite of rollers 38 and 40. The displacement of lever 166 switches the normally open switch 162 from its nonconducting state to its conducting state thereby energizing motor 56 by electrically connecting it to the AC line voltage source. The drive shaft 154 of motor 56 and toothed wheel 156 thereon are driven in a clockwise direction (as viewed in FIG. 2) thereby causing the lower rollers 40 and 52 to be driven in a clockwise direction through the drive belt connected toothed wheels 72 and 110 respectively. Through the mangle gear couplings, the top rollers 38 and 50 are rotatably driven in a counterclockwise direction in response to the clockwise rotation of lower rollers 40 and 52. Also, in response to the clockwise rotation of lower roller 52, the cover sheet advancing device 54 and the timing cam 165 begin the single revolution in a clockwise direction through its coupling to roller 52 provided by the speed reducing gear train defined by gears 112, 146 and 142.

The print advancing rollers 38 and 40 operatively engage the leading end of the print 18 inserted into their bite and advance the print 18 therebetween to the right (as viewed in FIG. 3) over the wetted and resiliently deformed applicator heads 88 and 90 and into operative engagement with the pressure-applying rollers 50 and 52. As the image-bearing surface 16 of print 18 advances over heads 88 and 90, they apply a thin coating of fluid 46 thereto and by the wiping action provided by the relative movement of surface 16 with respect to heads 88 and 90 they tend to wipe away or otherwise substantially remove any residual processing composition or other contaminants on surface 16.

As print 18 is advanced through the fluid-applying station 42, the cover sheet advancing device 54 is rotated in a clockwise direction so that the stack of cover sheets 12 and cassette 14 is pivoted slightly in a counterclockwise direction and the friction pad 141 engages the forwardmost cover sheet 12 and advances it upwardly against the underside of ramp 116 which deflects and guides the cover sheet towards the bite of pressure-applying rollers 50 and 52. This action of pad 141 also causes the deflection of the upper forward end of the stack to the left as noted earlier. The initial rotation of device 54 causes the timing cam 165 to rotate in a clockwise direction thereby activating switch 164 to latch on power to motor 56 before the print 18 becomes disengaged from the activating lever 166 of switch 162.

Through the coordinated operation of print advancing rollers 38 and 40 and cover sheet advancing device 54, the forward end of the print 18, following the first path of travel, and the cover sheet 12, following the second path of travel, are advanced substantially simultaneously into the bite of pressure-applying rollers 50 and 52 with the wetted or moistened image-bearing surface 16 of print 18 in facing relation to the layer 20 of bonding agent on cover sheet 12. The pressure-applying rollers 50 and 52 advance the print 18 and cover sheet 12 relative thereto while applying a compressive pressure to urge the wetted surface 16 into contact with layer 20 thereby actuating the bonding agent to effect the laminating bond. The application of the compressive pressure also helps to expel any air or excess fluid 46 that may be trapped between print 18 and cover sheet 12. The pressure-applying rollers 50 and 52 advance the laminate 19 emerging from the exit side thereof through opening 53 and laminate 19 drops into receptacle 26 upon being disengaged from rollers 50 and 52.

As device 54 and its associated cam 165 complete the single revolution, the flat face 174 of cam 165 confronts the free end of lever 172 thereby allowing lever 172 to move to the right causing switch 164 to switch to the nonconducting state. This deenergizes motor 56 which stops rotating abruptly by the action of its integral braking system to reset device 54 and cam 165 in the initial position in preparation for the next cycle of operation of apparatus 10.

Because certain changes may be made in the above-described apparatus 10 without departing from the scope of the invention herein involved, it is intended that all matter contained in the above description or shown in the accompanying drawings shall be interpreted as illustrative and not in a limiting sense.

What is claimed is:

1. Apparatus for bonding a transparent cover sheet to the image bearing surface of a photograph to form a laminate, the cover sheet being of the type including a layer of fluid activatable transparent bonding agent on one side thereof, said apparatus comprising:

means for receiving and supporting a plurality of such cover sheets arranged in stacked relation;
   means for providing a fluid treating station at which the image bearing surface of a photograph is adapted to be wetted and washed with a fluid for activating the bonding agent on a cover sheet;
   pressure-applying means including a pair of pressure-applying rollers for receiving the forward ends of a photograph and cover sheet, advanced into operative relation with the bite of said pressure-applying rollers with the wetted image-bearing surface of the photograph in facing relation to the layer of bonding agent on the cover sheet, for advancing the photograph and cover sheet relative thereto to bring them into superposition while applying pressure thereto to urge the fluid wetted image-bearing surface and the layer of bonding agent into contact thereby activating the bonding agent to establish a bond between the cover sheet and the image-bearing surface of the photograph;
   means for advancing a photograph relative to said fluid treating station and into operative relation with said pair of pressure-applying rollers whereby the image-bearing surface of the photograph is wetted and washed at said fluid treating station and the forward end of the photograph is located in operative engagement with the bite of said pressure-applying rollers; and
   means for advancing the forwardmost cover sheet in the stack into operative relation with said pressure-applying rollers and including means for deflecting the forward end of the forwardmost cover sheet toward the bite of said pressure-applying rollers while deflecting the forward ends of the cover sheets remaining in the stack away from the bite whereby the forward end of the advanced cover sheet is located in operative engagement with the bite of said pair of pressure-applying rollers substantially simultaneously with the forward end of the photograph with the layer of bonding agent on the cover sheet being disposed in facing relation to the wetted image-bearing surface of the photograph so that the cover sheet and photograph are advanced together and are brought into superposition by said pressure-applying rollers, said deflecting means including an inclined deflecting surface located intermediate the forward end of the forwardmost cover sheet in the stack and the bite of said pressure-applying means;
   said means for receiving and supporting the stack of cover sheets further including a cassette for holding the stack of cover sheets and means for movably mounting said cassette such that it moves with said stack of cover sheets between an initial position and a deflected position with respect to said inclined surface.

2. The apparatus as defined in claim 1 wherein said cassette mounting means also mounts the cassette for pivotal movement with respect to the bite of said pressure-applying rollers to position the forwardmost cover sheet in the stack in operative alignment with the bite of said pressure-applying rollers and said cover sheet advancing and deflecting means includes a flat surface disposed in substantially parallel relation to the bite of said pressure-applying rollers and against which the forwardmost cover sheet is adapted to bear to position it in said operative aligned position.

* * * * *